United States Patent
Fang et al.

(10) Patent No.: US 7,308,328 B2
(45) Date of Patent: *Dec. 11, 2007

(54) SYNCHRONIZED PROCESSING OF EAR SHELLS FOR HEARING AIDS

(75) Inventors: Tong Fang, Morganville, NJ (US); Jason Jenn-Kwei Tyan, Princeton, NJ (US); Ming Fang, Princeton Jct., NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 469 days.

This patent is subject to a terminal disclaimer.

(21) Appl. No.: 10/842,882

(22) Filed: May 11, 2004

(65) Prior Publication Data

US 2004/0264724 A1 Dec. 30, 2004

Related U.S. Application Data

(60) Provisional application No. 60/470,667, filed on May 15, 2003.

(51) Int. Cl.
*G06F 19/00* (2006.01)
(52) U.S. Cl. .................. 700/98; 381/328; 264/222; 700/118
(58) Field of Classification Search ............ 700/98, 700/117, 118, 97; 381/322, 328; 264/222; 181/130, 135; 345/420
See application file for complete search history.

(56) References Cited

U.S. PATENT DOCUMENTS 7,084,870 B2 * 8/2006 Fang et al. .................. 700/98

2004/0165741 A1 * 8/2004 Fang et al. .................. 381/322

FOREIGN PATENT DOCUMENTS

| DE | 40 41 105 A1 | 6/1992 |
|---|---|---|
| EP | 1 246 506 A1 | 10/2002 |
| EP | 1 345 470 A2 | 9/2003 |
| WO | WO 02/30157 A2 | 4/2002 |
| WO | WO 02/071794 A1 | 9/2002 |

OTHER PUBLICATIONS

International Search Report.

* cited by examiner

*Primary Examiner*—Leo Picard
*Assistant Examiner*—Steven R. Garland
(74) *Attorney, Agent, or Firm*—Donald B. Paschburg; F. Chau & Associates, LLC

(57) ABSTRACT

A system and method for synchronously processing ear shells for hearing aids comprising: loading data associated with a first and second ear shell; determining whether to perform a rigid or non-rigid registration of the data associated with the first and second ear shells, wherein the rigid registration is performed when shapes of the first and second ear shells are within a predetermined threshold, and the non-rigid registration is performed when the shapes of the first and second ear shells are not within the predetermined threshold; registering the data associated with the first and second ear shells; processing the first and second ear shells, wherein the processing is synchronously performed; and outputting the processed first and second ear shells to a display device.

34 Claims, 9 Drawing Sheets

SYNCHRONIZED PROCESSING OF EAR SHELLS FOR HEARING AIDS

CROSS-REFERENCE TO RELATED APPLICATIONS

This application claims the benefit of U.S. Provisional Application No. 60/470,667, filed May 15, 2003.

BACKGROUND OF THE INVENTION

1. Technical Field

The present invention relates to hearing aids and more particularly, to synchronized processing of ear shells for the manufacture of hearing aids.

2. Discussion of the Related Art

In most humans, hearing impairment occurs in both ears rather than a single ear. As a result, most humans require a hearing aid for both ears in order to compensate for their hearing loss. Hearing aids, however, are typically custom made because most humans have different levels of hearing loss and different inner canal, meatus and/or concha structures.

In order to manufacture a hearing aid or pair thereof, a health care professional takes impressions of a patient's left and right ears, which are duplicates of the contours of the patient's ears, and then forwards these impressions to a hearing aid manufacturer. The hearing aid manufacturer then replicates the impressions into, for example, ear shells so they will fit the patient and, then installs electronic hearing components into the shells thus completing the hearing aid manufacturing process.

In an effort to streamline the above manufacturing process, several computerized methods of manufacture have been developed. These methods commonly referred to as electronic modeling systems include sundry electronic detailing and modeling procedures, which are used to aid in the manufacture of hearing aids. These methods, however, typically manufacture each shell separately and require manual adjustments to the shells; thus, leading to inconsistencies between the shells, which increase the time and cost for the manufacture of hearing aids.

SUMMARY OF THE INVENTION

The present invention overcomes the foregoing and other problems encountered in the known teachings by providing a system and method for synchronously processing ear shells for hearing aids.

In one embodiment of the present invention, a method for synchronously processing ear shells for hearing aids comprises: loading data associated with a first and second ear shell; determining whether to perform a rigid or non-rigid registration of the data associated with the first and second ear shells, wherein the rigid registration is performed when shapes of the first and second ear shells are within a predetermined threshold, and the non-rigid registration is performed when the shapes of the first and second ear shells are not within the predetermined threshold; registering the data associated with the first and second ear shells; processing the first and second ear shells, wherein the processing is synchronously performed; and outputting the processed first and second ear shells to a display device.

The loading step comprises: obtaining three-dimensional (3D) models of the first and second ear shells; and reconstructing the 3D models, wherein the 3D models are obtained by scanning one of an auditory canal, concha, and meatus of an ear. The registering step comprises: determining similar features between the first and second ear shells; calculating a transformation matrix for the first and second ear shells; and determining differences between the first and second ear shells.

The processing step comprises: mapping data associated with an operation performed on the first ear shell to the second ear shell for synchronously performing the operation performed on the first ear shell on the second ear shell. The mapping step comprises: receiving the data associated with the first ear shell; and applying the transformation matrix associated with the registered data of the first and second ear shells.

An operation performed in the processing step is one of a detailing, modeling, and image manipulation. The detailing is one of a line cut, tapering, extension, relaxing, band selection, offset, and ipsilateral routing of signal (I-ROS) cutting. The modeling is one of a geometric adjustment, faceplate integration, vent channel formation, receiver hole formation, labeling, and collision detection. The image manipulation is one of a rotate, zoom, transformation, virtual cast, background ruler display, size measurement, and color change. The first and second ear shells may be left and right ear shells, or one of a pair of left ear shells and a pair of right ear shells.

In another embodiment of the present invention, a system for synchronously processing ear shells for hearing aids comprises: a memory device for storing a program; a processor in communication with the memory device, the processor operative with the program to: load data associated with a first and second ear shell; determine whether to perform a rigid or non-rigid registration of the data associated with the first and second ear shells; register the data associated with the first and second ear shells; process the first and second ear shells, wherein the processing is synchronously performed; and display the processing of the first and second ear shells on a display device in a split-screen format. The processor is further operative with the program to store data associated with the loading, registering, and processing of the first and second ear shells, and the data associated with the first and second ear shells is stored in one of a database, and memory.

In yet another embodiment of the present invention, a computer program product comprising a computer useable medium having computer program logic recorded thereon for synchronously processing ear shells for hearing aids, the computer program logic comprises: program code for loading data associated with a first and second ear shell; program code for determining whether to perform a rigid or non-rigid registration of the data associated with the first and second ear shells; program code for registering the data associated with the first and second ear shells; and program code for processing the first and second ear shells, wherein the processing is synchronously performed.

In another embodiment of the present invention, a system for synchronously processing ear shells for hearing aids comprises: means for loading data associated with a first and second ear shell; means for determining whether to perform a rigid or non-rigid registration of the data associated with the first and second ear shells; means for registering the data associated with the first and second ear shells; and means for processing the first and second ear shells, wherein the processing is synchronously performed.

In yet another embodiment of the present invention, a method for synchronously processing ear shells for hearing aids comprises: loading data associated with a first and second ear shell, wherein the data associated with the first and second ear shells is obtained by scanning an impression of the first and second ear shells; determining whether to perform a rigid or non-rigid registration of the data associated with the first and second ear shells, wherein the rigid registration is performed when shapes of the first and second ear shells are within a predetermined threshold, and the non-rigid registration is performed when the shapes of the first and second ear shells are not within the predetermined threshold; registering the data associated with the first and second ear shells so that a relative position and orientation of the first shell with respect to the second shell can be determined; and processing the first and second ear shells, wherein the processing on the first ear shell is synchronously performed on the second ear shell using data from the registration of the first and second ear shells.

In another embodiment of the present invention, a method for synchronously processing ear shells for hearing aids comprises: loading data associated with a first and second ear shell; determining whether to perform a rigid or non-rigid registration of the data associated with the first and second ear shells, wherein the rigid registration is performed when shapes of the first and second ear shells are within a predetermined threshold, and the non-rigid registration is performed when the shapes of the first and second ear shells are not within the predetermined threshold; registering the data associated with the first and second ear shells by: determining similar features between the first and second ear shells; calculating a transformation matrix for the first and second ear shells; and determining a difference between the first and second ear shells; performing an operation on the first ear shell, wherein the operation is one of a detailing, modeling, and image manipulation; storing data associated with the operation performed on the first ear shell; mapping the data associated with the operation performed on the first ear shell to the second ear shell, wherein the data is mapped by using the transformation matrix of the first and second ear shells; performing the operation performed on the first ear shell on the second ear shell, wherein the operation is performed in a substantially synchronous manner; and displaying the operations performed on the first and second ear shells on a display device in a split-screen format.

The foregoing advantages and features are of representative embodiments and are presented to assist in understanding the invention. It should be understood that they are not intended to be considered limitations on the invention as defined by the claims, or limitations on equivalents to the claims. Therefore, this summary of features and advantages should not be considered dispositive in determining equivalents. Additional features and advantages of the invention will become apparent in the following description, from the drawings and from the claims.

DETAILED DESCRIPTION OF EXEMPLARY EMBODIMENTS

Figure 1:
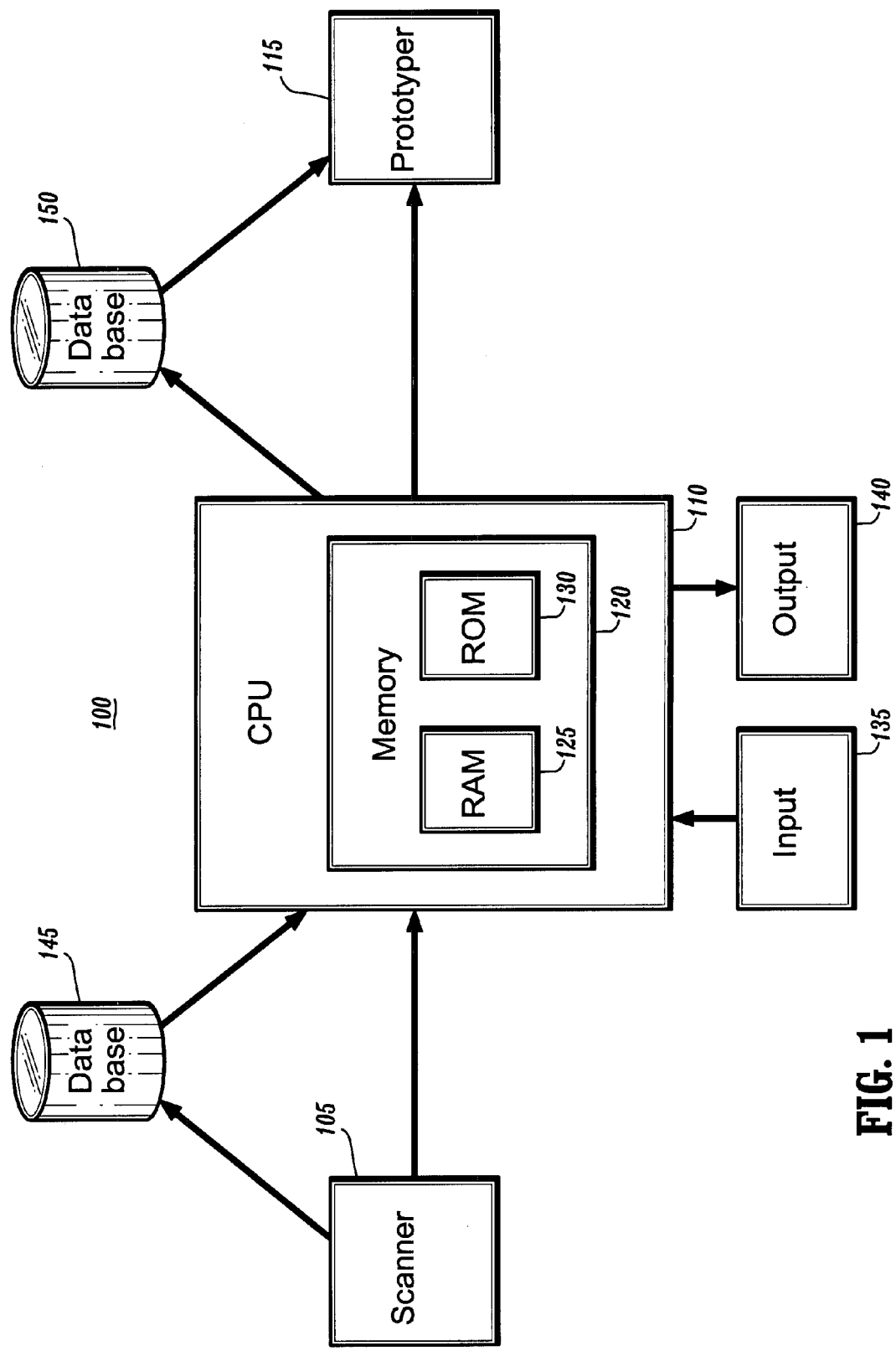
FIG. 1 is a block diagram of a system for synchronously processing ear shells for hearing aids according to an exemplary embodiment of the present invention.

FIG. 1 is a block diagram of a system for synchronously processing ear shells for hearing aids 100 according to an exemplary embodiment of the present invention. As shown in FIG. 1, the system 100 includes, inter alia, a three-dimensional (3D) scanner 105, a central processing unit (CPU) 110 and a prototyping machine (i.e., prototyper) 15. The CPU 110 includes a memory 120 and is operatively connected to an input 135 and an output 140.

The memory 120 includes a random access memory (RAM) 125 and a read only memory (ROM) 130. The memory 120 can also include a database, disk drive, tape drive, etc., or a combination thereof. The RAM 125 functions as a data memory that stores data used during the execution of the program in the CPU 110 and is used as a work area. The ROM 130 functions as a program memory for storing a program executed in the CPU 110. The input 135 is constituted by a keyboard, mouse, etc. and the output 140 is constituted by a liquid crystal display (LCD), cathode ray tube (CRT) display, printer, etc.

The scanner 105, which is used to scan an impression of an ear, may communicate directly to the CPU 110 via a wired and/or wireless connection or in-directly via a database 145 or a server. The database 145 may be connected to the scanner 105 or the CPU 110 via a local area network (LAN), wide area network (WAN) or the internet, etc. The scanner 105 may be, for example, an optical, ultrasound, magnetic resonance (MR) or computed tomographic (CT) type 3D scanner.

The prototyper 115, which is used to prototype and/or model (i.e., process) ear shells for hearing aids, may communicate directly with the CPU 110 via a wired and/or wireless connection or in-directly via a database 150 or a server. The database 150 may also be connected to the prototyper 115 or the CPU 110 via a LAN, WAN or the internet, etc. The prototyper 115 may produce a physical version of the ear shell, which becomes a hearing aid, using a prototyping/modeling technique such as Milling, stereo lithography, solid ground curing, selective laser sintering, direct shell production casting, 3D-printing, topographic shell fabrication, fused deposition modeling, inkjet modeling, laminated object manufacturing, nano-printing, etc.

It is to be understood that detailing and modeling procedures are performed when synchronously processing ear shells for hearing aids in accordance with the present invention. Accordingly, a brief description of the detailing and modeling procedures will now be discussed. It is to be further understood that the following detailing and modeling procedures may be performed in a variety of sequences with satisfactory results.

Detailing employs several functions based on data related to a patient's ear impressions or several patients' ear impressions. These functions may be, for example, a surface reconstruction, line cut, canal tapering, local relaxing, canal extension, band selection, offset, etc. In the first step of the detailing procedure, data associated with a patient's ear impressions or data associated several patient's ear impressions is loaded into the CPU 110, memory 120 or database 145. This is accomplished by scanning the ear impressions using the 3D scanner 105 and storing the impressions in a format such as point cloud format (i.e., .ASC) or stereo lithography format (i.e., .STL), etc.

Included in the loading procedure is a surface reconstruction of the scanned ear impressions. A surface reconstruction is typically performed because data received from the 3D scanner 105 may consist of certain outliers, noise and holes, which result in incomplete or inadequate surface models of the impressions. In order to reconstruct the surfaces, a robust data pre-processing method (e.g., rapid triangulation, 3D alpha shape, delaunay mesh generation, Quickhuall, voronori, etc.) is implemented to remove the outliers, reduce the noise, and fill small holes while preserving the original geometry of the surface models. The surface reconstructions may additionally remove a number of defects resulting from different sources such as scars, earwax, tissue, or hair in the ear.

Subsequent to the creation of the surface models of the impressions, additional detailing steps and/or modifications are performed to create final models of the ear shells to be manufactured into hearing aids. An additional detailing step that may be performed on the surface models of the ear shells is a line cut for reducing the models to a desired size and shape. This is accomplished by defining a cutting plane that divides an impression shell into two parts and, removing a portion of the impression shell that is not desired. The line cut also includes several functions such as, open line cut, close line cut, bottom line cut, and rounding. All of which may be used to modify the impression shells. Open line cut is used to cut an impression shell at specified positions resulting in an open model at the area of application. Close line cut is similar to the open line cut; however, it has an additional step that fills open contours at specified cutting positions resulting in a closed impression at the area of application.

After performing the line cut and its associated functions, the impression shells may be further modified by using tapering and extension functions. The tapering function is used to trim the canal tip (of the ear canal) if it is overly extended and taper the resulting impressions. The tapering function is typically used to smooth the edge of a line following a close cut operation. In contrast to tapering, extension is used to extend the canal along the topology of the canal tip when the resulting canal is too short.

Further modifications to the impression shells may be performed during the detailing process. These modifications are accomplished through use of the following functions, inter alia: local relaxing; band selection; offset; and ipsilateral routing of signal (I-ROS) cutting. Local relaxing is used to remove additional bumps, artifacts or voids or fill up dimples or depressions in the impression shells by implementing the relaxation on a selected local surface area (e.g., a region of interest) and recovering the surface. Band selection is used to provide more specific band-like shapes around the impressions and is typically used in conjunction with an offset to apply changes (e.g., expansion and shrinkage) to specified bands of the impression shells. Offset is used to make volumetric changes such as expansion and shrinkage in the impression shells for fitting assessment and remarks. This function has two modes: local offset and global offset. In local offset only a selected portion of an impression will be changed, whereas in the global offset the entire impression shells may be changed. I-ROS utilizes a non-occluding design without contralateral routing and is used to create impressions for patients with mild to moderate high frequency hearing loss. Upon completion of detailing, the detailed impressions are transferred to a point cloud or stereo lithographic format and stored in a CPU, database or memory for future use, particularly for modeling of the ear shells.

Subsequently, modeling begins in an effort to create a physical version (i.e., a hearing aid) of the detailed impressions. When modeling, several operations may be performed on the detailed impression, such as adjusting wall thickness, faceplate integration, vent channel and receiver hole formation, labeling, collision detection, etc., to create the physical version of the detailed impressions.

One of the first operations typically performed on the impressions is to optimize their geometries. The detailed impressions' wall thicknesses may be modified in order to increase the strength and stability of the impressions, or a face or cover plate may be applied to the impressions. In order to integrate the faceplate to the impressions an area is created for the faceplate by cutting away part of, for example, one of the impressions. This area is carefully configured so that the faceplate will be aligned with electronic hearing components that are or will be placed in the impression. Once the cutting is complete the faceplate is applied to the impression. In order to ensure proper performance of the physical version of the impressions, a pressure compensation/ventilation channel or a sound bore is created.

Component placement is an additional process undertaken during modeling. It is, for example, an iterative process in which components are placed on or in the impressions until a desirable arrangement is obtained. Several design tools are used to assist in component placement such as locking and placing components in relation to the impressions' surfaces and collision detection so that components do not interfere with each other or the impressions. After the modeling process is complete, a unique identifier and/or label is typically placed on the physical versions of the impressions. The label or identifier may be a serial number, barcode or color code, etc.

Figure 2:
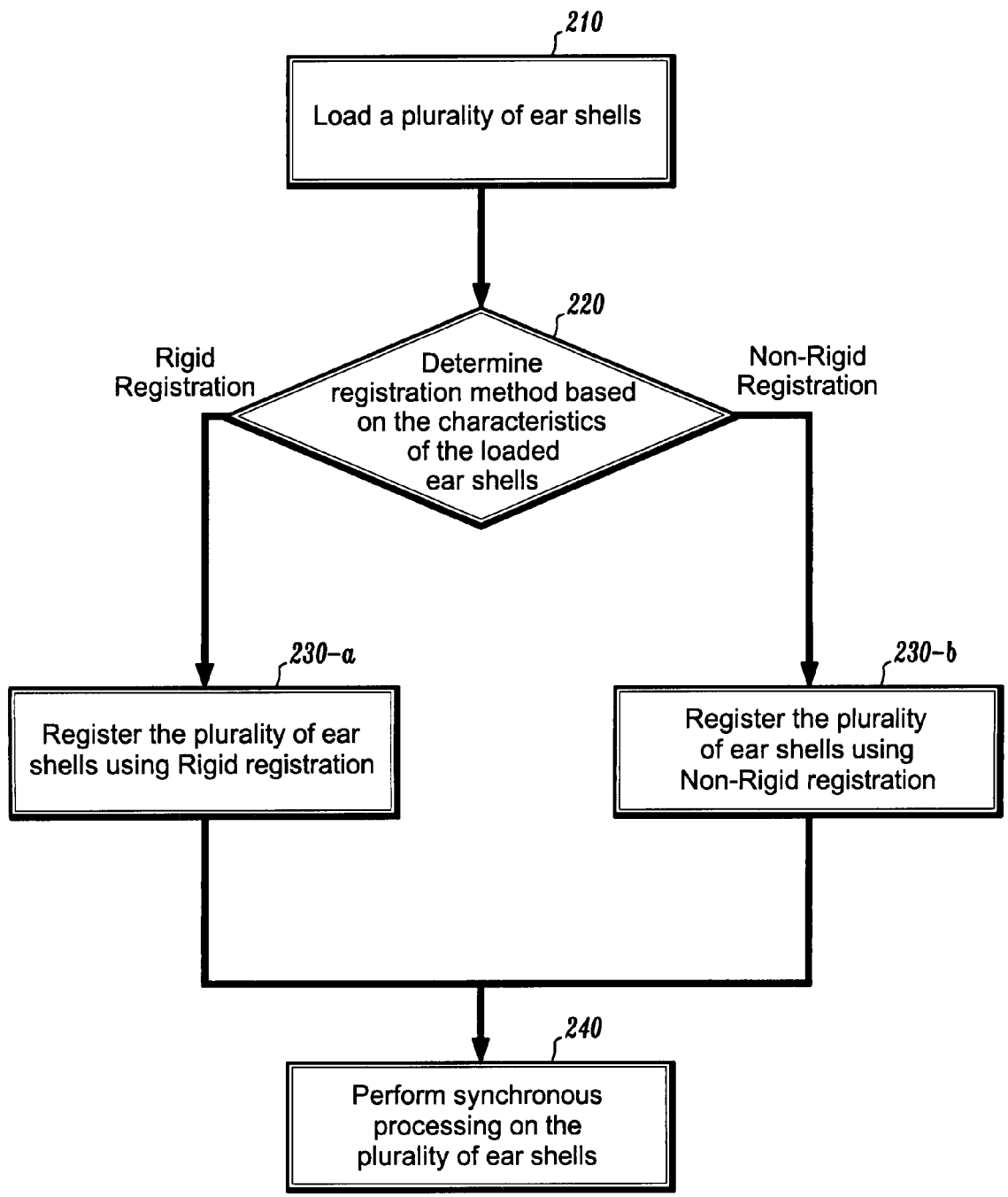
FIG. 2 is a flowchart illustrating synchronously processing ear shells for hearing aids according to an exemplary embodiment of the present invention.

FIG. 2 is a flowchart illustrating synchronously processing ear shells for hearing aids according to an exemplary embodiment of the present invention. As shown in FIG. 2, data from a plurality of ear shells, which includes first and second ear shells, is loaded into the CPU 110 (step 210). As discussed above, the data from the plurality of ear shells is loaded by first acquiring physical ear impressions of a patient or several patients' ears from a medical professional and then scanning the impressions with the scanner 105. The scanned impressions are stored in a point cloud, stereo lithographic, rhino, wavefront, etc. format and are then transmitted to the CPU 110.

Once the data related to the scanned impressions is in the CPU 110 the data is reconstructed to form a pair of 3D surface shell models. The 3D models of the shells are geometric surfaces parameterized by a set of vertices, which are connected to each other by triangles. The 3D models of the shells are viewed by an operator via the output device 140, such as a CRT display, in a split-screen format and/or view 400 as shown in FIG. 4. It is to be understood that the process described with reference to FIG. 2, is fully automated and handles the steps with no operator interaction. The operator, however, may interact when necessary via an input device 135 such as a keyboard or a personal digital assistant (PDA), as will be discussed hereinafter with reference to FIG. 3.

After the plurality of ear shells are loaded into the CPU 110, it is determined if they should be registered using a rigid or a non-rigid registration technique (step 220). The rigid registration technique typically requires the identification of at least three common anatomical landmarks between the plurality of ear shells, whereas the non-rigid registration technique is applied when fewer than, for example, three common anatomical landmarks are found between the plurality of ear shells. Thus, for example, the rigid registration technique is used when shapes of the first and second ear shells are within a predetermined threshold (e.g., having three or more anatomical landmarks in common), and the non-rigid registration technique is used when the shapes of the first and second ear shells are not within the predetermined threshold (e.g., having less than three anatomical landmarks in common).

After step 220, the data associated with the loaded ear shells is registered (steps 230-a,b). During either rigid registration (step 230-a) or non-rigid registration (230-b) the parameterized set of vertices or triangles (i.e., vertex/triangle) associated with the shells is stored in the memory 120 and/or database 145. Rigid and/or non-rigid registration enables the transformation matrix between two shells to be determined and thus, the corresponding vertex/triangle in one shell and a vertex/triangle in another shell can be located.

Once in the memory 120 or database 145, the data associated with the features of the first and second ear shells is stored in corresponding registration fields. For example, the data associated with the first ear shell canal and concha and the data associated with the second ear shell canal and concha are stored in first and second ear fields corresponding to canal and concha, respectively. It is to be understood that the registration fields are also used to store data for general ear features such as curvature, moments, principle vectors, etc. or specific ear features such as canal, canal tip, base, helix/anti-helix, concha, tragus/anti-tragus, etc. As further shown in FIG. 2, after the plurality of ear shells have been registered they are synchronously processed (step 240).

Figure 3:
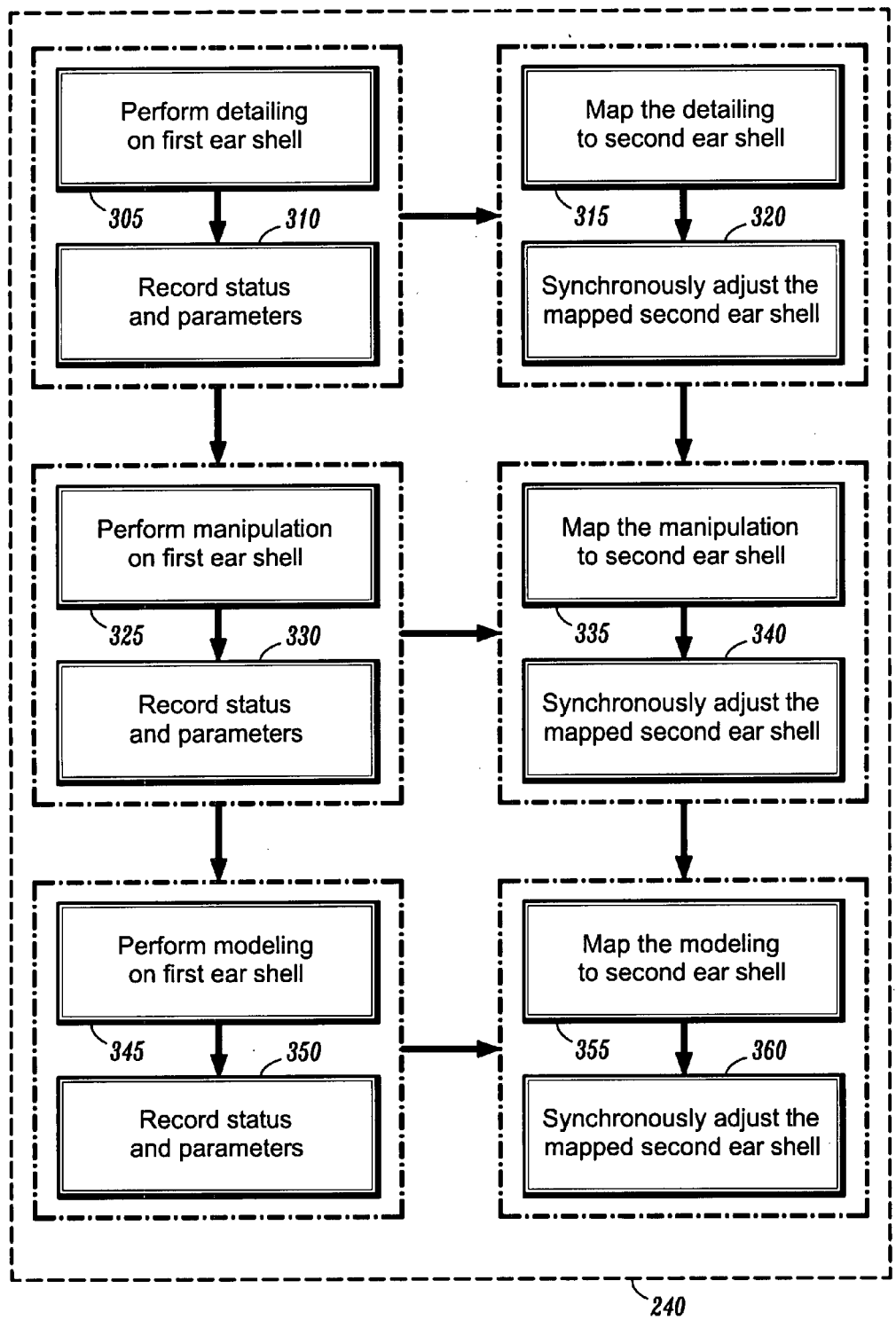
FIG. 3 is a flowchart illustrating synchronously processing ear shells for hearing aids according to a processing step of FIG. 2.
Figure 4:
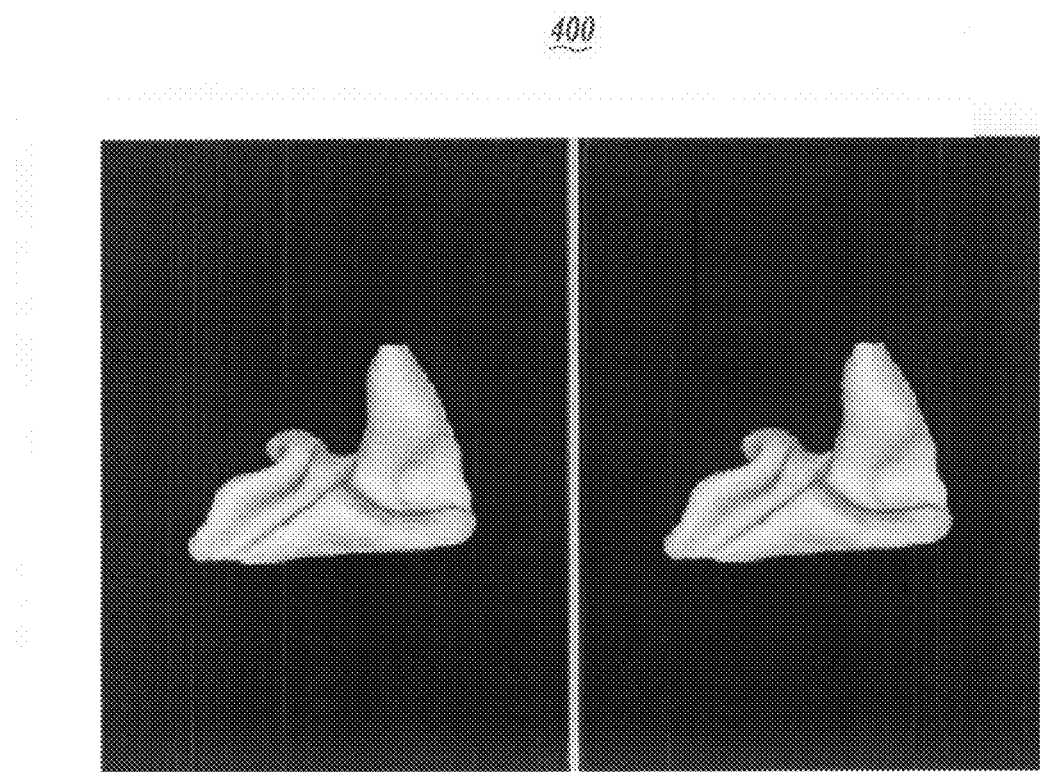
FIG. 4 illustrates two ear shells in a split-screen format according to an exemplary embodiment of the present invention.

FIG. 3 is a flowchart illustrating the synchronous processing of the plurality of ear shells in step 240 of FIG. 2. For ease of reference, FIG. 3 illustrates the synchronous processing of a first and second ear shell, and should not be construed as limiting the scope of the invention to only synchronously processing two ear shells.

Figure 5:
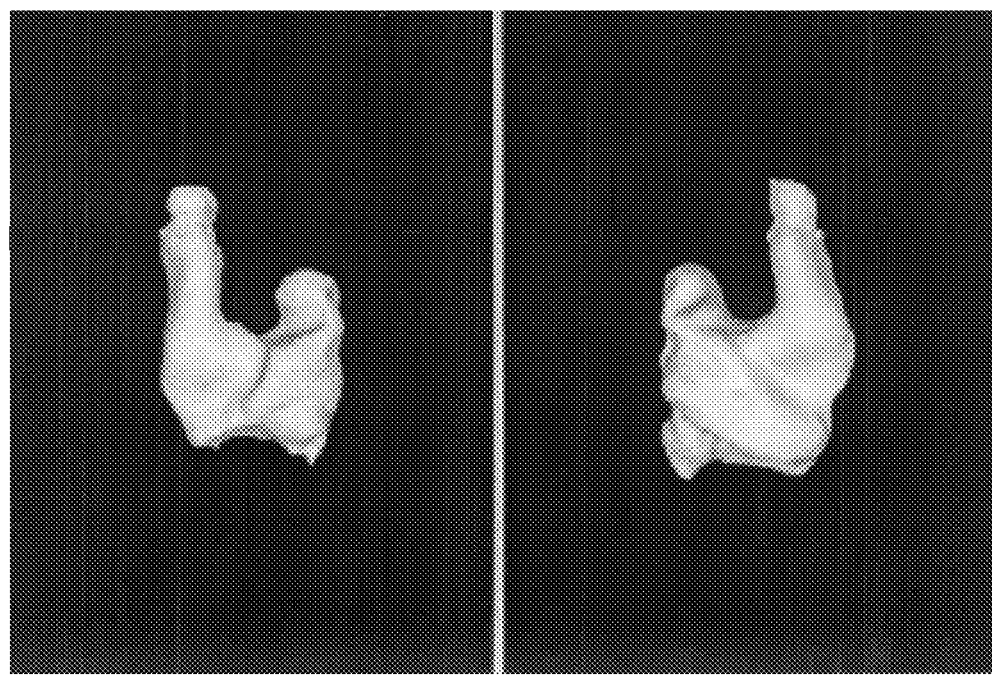
FIG. 5 illustrates two ear shells during a detailing operation.

As shown in FIG. 3, a detailing step is performed on the first ear shell (step 305). More specifically, a pre-tapering operation is performed in which an image plane is placed through a section of the first ear shell for identifying an area above or below for tapering. The pre-tapering operation is illustrated in the left image of a split-screen view 500 in FIG. 5. In accordance with the present invention, several screens and/or windows can be viewed simultaneously on a display, and the operations therein can be synchronized. In addition, a "synchronize enable" button or function may be provided on the display or input device 135 so that an operator may synchronize and/or un-synchronize the operations performed in the windows being viewed on the display.

It is to be understood that any number of detailing and/or modeling steps, and image manipulations may be performed in step 305 including but not limited to detailing steps such as line cut, tapering, extension, relaxing, offsetting, etc., modeling steps such as adjusting wall thickness, faceplate integration, vent channel and receiver hole formation, labeling, collision detection, etc., and image manipulations such as rotating, zooming, transforming, virtual casting, background ruler displaying, size measuring, and color changing.

In addition, the detailing and modeling steps, and image manipulations may be performed in any order and may be performed on a left or right ear shell or several left and/or right ear shells simultaneously. It is to be further understood, however, that the detailing steps are to be completed before executing the modeling steps, and that image manipulations can occur during either of the detailing or modeling steps.

After the detailing step is performed its status and parameters (e.g., the parameters associated with the location of the plane where the plane placement took place) are recorded and stored in a memory such as the RAM 125 (step 310). Next, the data stored in step 310 is mapped to the second ear shell (step 315). This is accomplished by using the recorded data from step 310 (e.g., the recorded operation name and parameters) and the registration data from either step 230-a or 230-a (e.g., the transformation matrix) to determine the corresponding position on the second ear shell where the detailing operation will take place. The recorded operation is then synchronously performed on the second ear shell (step 320). In other words, the data associated with the plane that was placed through the first ear shell in step 305 is now applied to the second ear shell so that the same plane placement takes place in a synchronized fashion on the second ear shell as shown in the right image of FIG. 5. As the process (steps 305-320) takes milliseconds or less to complete, the changes in the left and right images of FIG. 5 occur synchronously and in real-time.

The operation in step 320 is accomplished by using the registration data that accounted for the differences between the features and/or characteristics of the first and second ear shells and compensating for those differences by applying a synchronized adjustment to the mapped second ear shell in the areas where differences exist. It is to be understood, however, that if the mapped second ear shell exceeds certain thresholds due to a non-paired case (e.g., when the first and second ear shells have significant differences in their sizes and shapes) the process may be paused and an operator may manually adjust the plane placement in an up and/or down position to compensate for an error introduced during the synchronized adjustment step 320. A toggle button, for example, may be provided on the input device 135 so that an operator can stop the system for synchronized processing and make manual adjustments where necessary.

Figure 6:
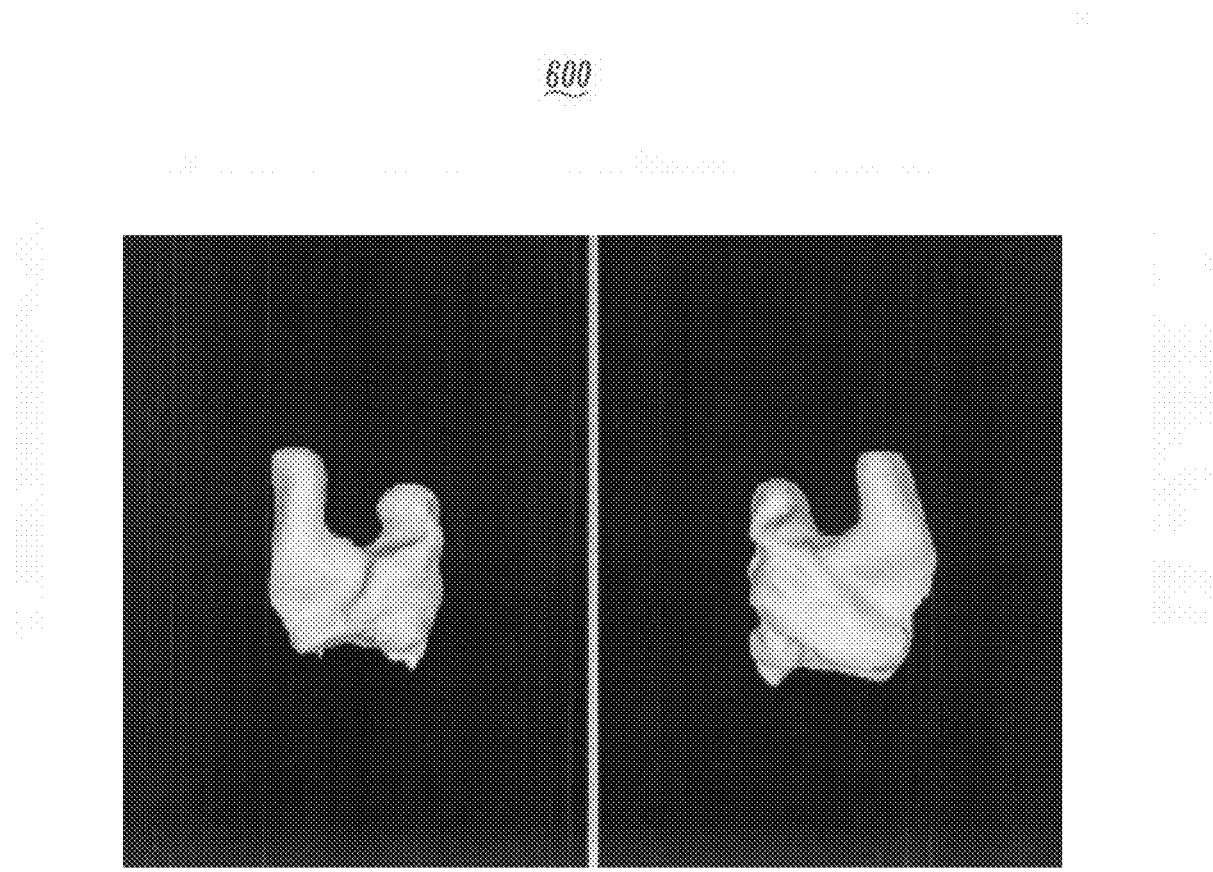
FIG. 6 illustrates the two ear shells of FIG. 5 after the detailing operation.

After step 320, the flowchart of FIG. 3 proceeds to step 325. It should be understood, however, that upon completion of step 320, another detailing procedure could be performed, by repeating steps 305-320. For example, FIG. 6 illustrates the result of a tapering operation 600, which was performed using the pre-tapering data taken from the images of FIG. 5, by repeating the steps 305-320 (with the tapering operation).

Figure 7:
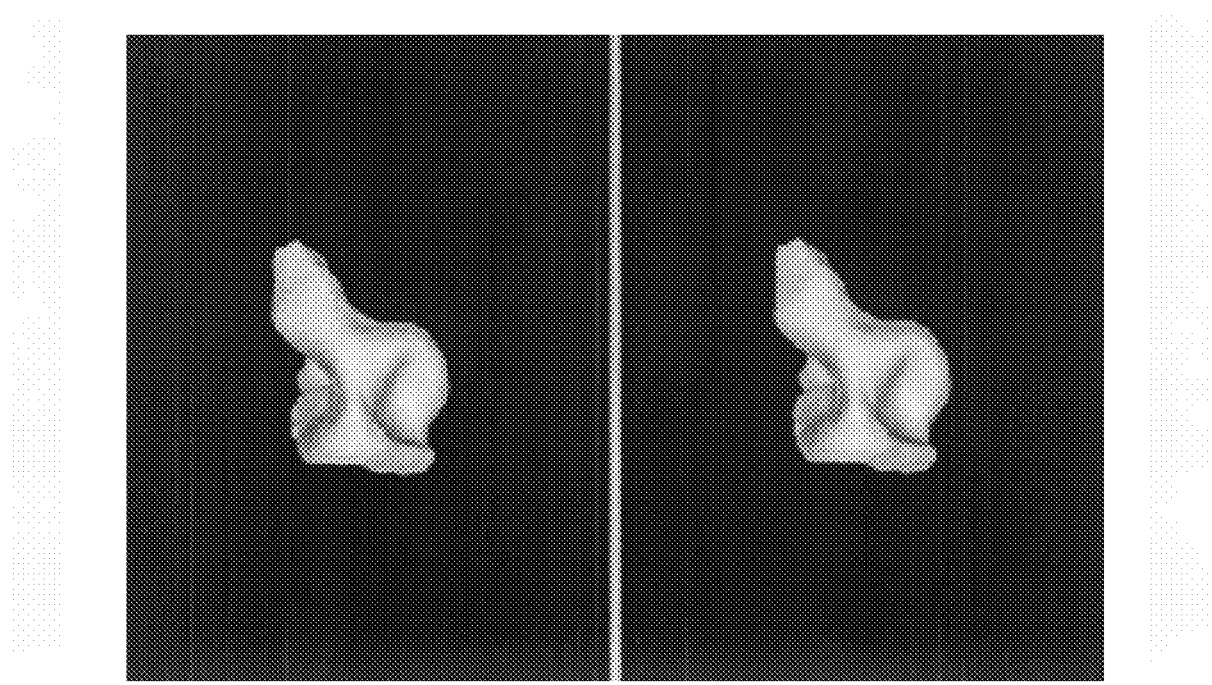
FIG. 7 illustrates the two ear shells of FIG. 4 after a rotate operation.

In step 325 an image manipulation is performed. More specifically, an image manipulation such as rotating is performed on the first ear shell in step 325. After the rotation takes place, the status and parameters of the rotation are stored (step 330), and then they are mapped to the second ear shell (step 335). Both of these steps are similar to or the same as steps 310 and 315 but with different data being involved. Following the mapping step 335, the second ear shell is synchronously adjusted to reflect the process that was performed on the first ear shell (step 340). The rotated shells are displayed in real-time to an operator as shown, for example, in a split-screen view 700 of FIG. 7.

Figure 8:
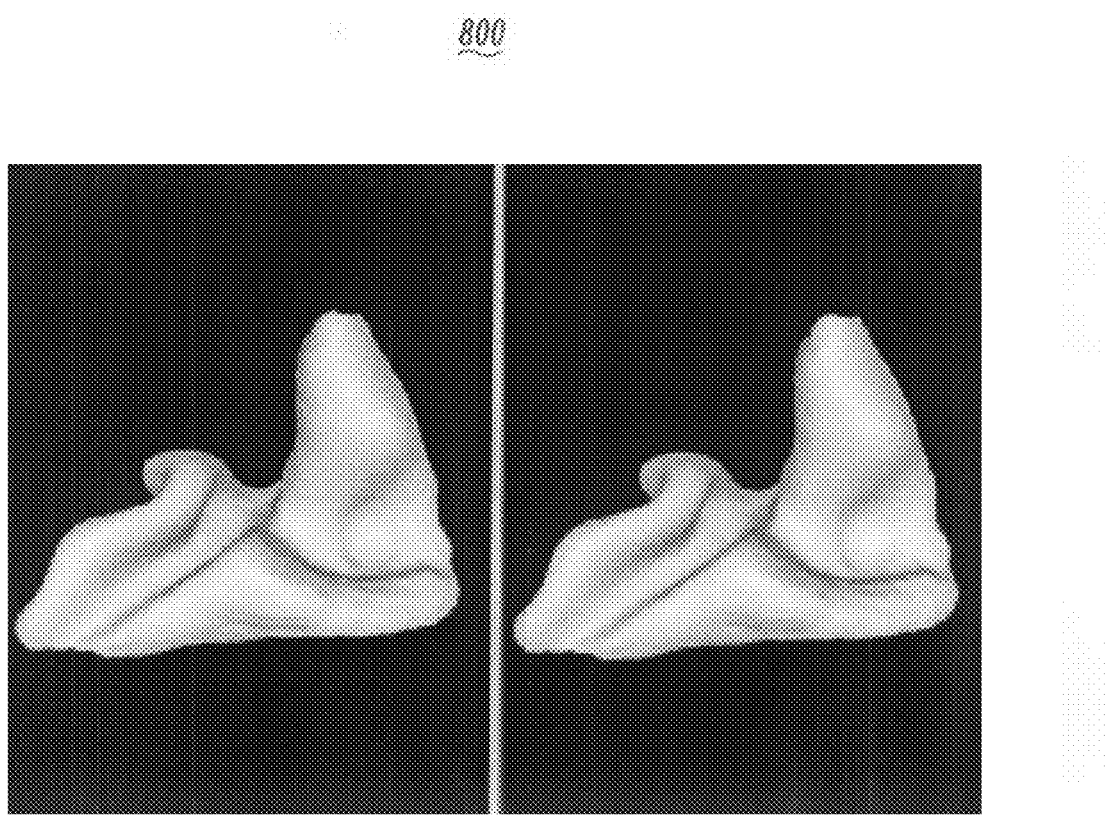
FIG. 8 illustrates the two ear shells of FIG. 4 after a zoom operation.

After step 340, the flowchart of FIG. 3 proceeds to step 345, or another image manipulation could be performed, by repeating steps 325-340. For example, FIG. 8 illustrates a zoom operation 800, which illustrates a close-up of the un-rotated images of FIG. 4, by repeating the steps 325-340 with a zoom operation instead of the rotate operation.

Figure 9:
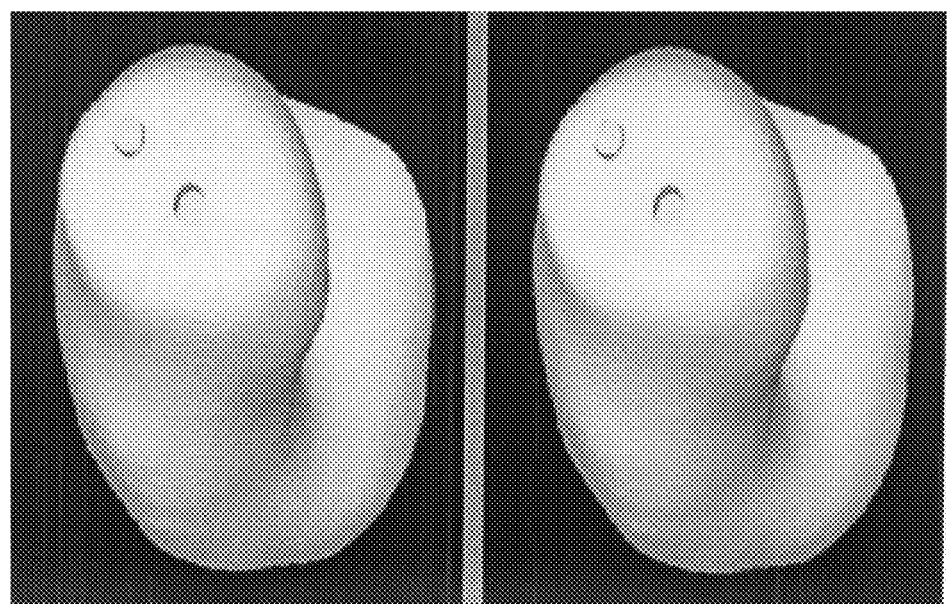
FIG. 9 illustrates two ear shells after a modeling operation.

As shown in FIG. 3, a modeling operation is performed (step 345). In particular, a modeling operation such as transducer exit hole drilling is performed on the first ear shell in step 345. After the transducer exit hole drilling takes place, its status and parameters are stored (step 350), and then they are mapped to the second ear shell (step 355). Following the mapping step 355, the second ear shell is synchronously adjusted to reflect the process that was performed on the first ear shell (step 360). The modeled shells are displayed in real-time to the operator as shown, for example, in a split-screen view 900 of FIG. 9.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for processing ear shells for hearing aids, comprising:
    loading data associated with a first and second ear shell;
    determining whether to perform a rigid or non-rigid registration of the data associated with the first and second ear shells;
    registering the data associated with the first and second ear shells;
    performing a first processing operation on the first ear shell;
    performing the first processing operation on the second ear shell, wherein the first processing operation is performed on the second ear shell immediately after the first processing operation is performed on the first ear shell; and
    outputting images of the first and second ear shells to a display device when the first processing operations are performed.

2. The method of claim 1, wherein the loading step comprises:
    obtaining three-dimensional (3D) models of the first and second ear shells; and
    reconstructing the 3D models.

3. The method of claim 2, wherein the 3D models are obtained by scanning one of an auditory canal, concha, and meatus of an ear.

4. The method of claim 1, wherein the rigid registration is performed when shapes of the first and second ear shells are within a predetermined threshold.

5. The method of claim 1, wherein the non-rigid registration is performed when shapes of the first and second ear shells are not within a predetermined threshold.

6. The method of claim 1, wherein the registering step comprises:
    determining similar features between the first and second ear shells;
    calculating a transformation matrix for the first and second ear shells; and
    determining differences between the first and second ear shells.

7. The method of claim 1, wherein the first processing operation is performed on the second ear shell by:
    mapping data associated with the first processing operation performed on the first ear shell to the second ear shell.

8. The method of claim 7, wherein the mapping step comprises:
    receiving the data associated with the first ear shell; and
    applying a transformation matrix associated with the registered data of the first and second ear shells.

9. The method of claim 1, wherein the first processing operation is one of a detailing, modeling, and image manipulation.

10. The method of claim 9, wherein the detailing is one of a line cut, tapering, extension, relaxing, band selection, offset, and ipsilateral routing of signal (I-ROS) cutting.

11. The method of claim 9, wherein the modeling is one of a geometric adjustment, faceplate integration, vent channel formation, receiver hole formation, labeling, and collision detection.

12. The method of claim 9, wherein the image manipulation is one of a rotate, zoom, transformation, virtual cast, background ruler display, size measurement, and color change.

13. The method of claim 1, wherein the first and second ear shells are left and right ear shells.

14. The method of claim 1, wherein the first and second ear shells are one of a pair of left ear shells and a pair of right ear shells.

15. A system for processing ear shells for hearing aids, comprising:
    a memory device for storing a program;
    a processor in communication with the memory device, the processor operative with the program to:
    load data associated with a first and second ear shell;
    determine whether to perform a rigid or non-rigid registration of the data associated with the first and second ear shells;

register the data associated with the first and second ear shells;

perform a first processing operation on the first ear shell;

perform the first processing operation on the second ear shell, wherein the first processing operation is performed on the second ear shell immediately after the first processing operation is performed on the first ear shell; and display images of the first and second ear shells on a display device when the first processing operations are performed.

16. The system of claim 15, wherein the processor is further operative with the program, when loading, to:
obtain three-dimensional (3D) models of the first and second ear shells; and
reconstruct the 3D models.

17. The system of claim 16, wherein the 3D models are obtained by scanning one of an auditory canal, concha, and meatus of an ear.

18. The system of claim 15, wherein the rigid registration is performed when shapes of the first and second ear shells are within a predetermined threshold.

19. The system of claim 15, wherein the non-rigid registration is performed when shapes of the first and second ear shells are not within a predetermined threshold.

20. The system of claim 15, wherein the processor is further operative with the program, when registering, to:
determine similar features between the first and second ear shells;
calculate a transformation matrix for the first and second ear shells; and
determine differences between the first and second ear shells.

21. The system of claim 15, wherein the processor is further operative with the program, when performing the first processing operation on the second ear shell, to:
map data associated with the first processing operation performed on the first ear shell to the second ear shell.

22. The system of claim 21, wherein the processor is further operative with the program, when mapping, to:
receive the data associated with the first ear shell; and
apply a transformation matrix associated with the registered data of the first and second ear shells.

23. The system of claim 15, wherein the first processing operation is one of a detailing, modeling, and image manipulation.

24. The system of claim 23, wherein the detailing is one of a line cut, tapering, extension, relaxing, band selection, offset, and ipsilateral routing of signal (I-ROS) cutting.

25. The system of claim 23, wherein the modeling is one of a geometric adjustment, faceplate integration, vent channel formation, receiver hole formation, labeling, and collision detection.

26. The system of claim 23, wherein the image manipulation is one of a rotate, zoom, transformation, virtual cast, background ruler display, size measurement, and color change.

27. The system of claim 15, wherein the first and second ear shells are left and right ear shells.

28. The system of claim 15, wherein the first and second ear shells are one of a pair of left ear shells and a pair of right ear shells.

29. The system of claim 15, wherein the processor is further operative with the program to:

store data associated with the loading of the first and second ear shells, registering of the first and second ear shells, and first processing operations performed on the first and second ear shells.

30. The method of claim 29, wherein the data associated with the loading of the first and second ear shells, registering of the first and second ear shells, and first processing operations performed on the first and second ear shells is stored in one of a database, and memory.

31. A computer program product comprising a computer useable medium having computer program logic recorded thereon for processing ear shells for hearing aids, the computer program logic comprising:
program code for loading data associated with a first and second ear shell;
program code for determining whether to perform a rigid or non-rigid registration of the data associated with the first and second ear shells;
program code for registering the data associated with the first and second ear shells;
program code for performing a first processing operation on the first ear shell;
program code for performing the first processing operation on the second ear shell, wherein the first processing operation is performed on the second ear shell immediately after the first processing operation is performed on the first ear shell; and
program code for outputting images of the first and second ear shells to a display device when the first processing operations are performed.

32. A system for processing ear shells for hearing aids, comprising:
means for loading data associated with a first and second ear shell;
means for determining whether to perform a rigid or non-rigid registration of the data associated with the first and second ear shells;
means for registering the data associated with the first and second ear shells;
means for performing a first processing operation on the first ear shell;
means for performing the first processing operation on the second ear shell, wherein the first processing operation is performed on the second ear shell immediately after the first processing operation is performed on the first ear shell; and
means for displaying images of the first and second ear shells when the first processing operations are performed.

33. A method for processing ear shells for hearing aids, comprising:
loading data associated with a first and second ear shell, wherein the data associated with the first and second ear shells is obtained by scanning an impression of the first and second ear shells:
determining whether to perform a rigid or non-rigid registration of the data associated with the first and second ear shells, wherein the rigid registration is performed when shapes of the first and second ear shells are within a predetermined threshold, and the non-rigid registration is performed when the shapes of the first and second ear shells are not within the predetermined threshold;
registering the data associated with the first and second ear shells so that a relative position and orientation of the first shell with respect to the second shell can be determined;

performing a processing operation on each of the first and second ear shells, wherein the processing operation performed on the first ear shell is performed on the second ear shell immediately after the processing operation is performed on the first car shell by using data from the registration of the first and second ear shells; and displaying images of the first and second ear shells on a display device when the processing operations are performed.

34. A method for processing ear shells for hearing aids, comprising:

loading data associated with a first and a second ear shell;

determining whether to perform a rigid or non-rigid registration of the data associated with the first and second ear shells, wherein the rigid registration is performed when shapes of the first and second ear shells are within a predetermined threshold, and the non-rigid registration is performed when the shapes of the first and second ear shells are not within the predetermined threshold;

registering the data associated with the first and second ear shells by: determining similar features between the first and second ear shells; calculating a transformation matrix for the first and second ear shells; and determining a difference between the first and second ear shells;

performing an operation on the first ear shell, wherein the operation is one of a detailing, modeling, and image manipulation;

storing data associated with the operation performed on the first ear shell;

mapping the data associated with the operation performed on the first ear shell to the second ear shell, wherein the data is mapped by using the transformation matrix of the first and second ear shells;

performing the operation performed on the first ear shell on the second ear shell, wherein the operation is performed on the second ear shell immediately after the operation is performed on the first ear shell; and displaying images of the first and second ear shells on a display device in a spilt-screen format when the operations are performed.

* * * * *